(12) United States Patent
Abraham (10) Patent No.: US 11,089,163 B2
(45) Date of Patent: Aug. 10, 2021

(54) AUTOMATED QUEUING SYSTEM AND QUEUE MANAGEMENT

(71) Applicant: Avaya Inc., Santa Clara, CA (US)

(72) Inventor: Jinson Abraham, Ontario (CA)

(73) Assignee: Avaya Inc., Santa Clara, CA (US)

( * ) Notice: Subject to any disclaimer, the term of this patent is extended or adjusted under 35 U.S.C. 154(b) by 90 days.

(21) Appl. No.: 16/356,954

(22) Filed: Mar. 18, 2019

(65) Prior Publication Data

US 2020/0304643 A1    Sep. 24, 2020

(51) Int. Cl.
*H04M 3/42* (2006.01)
*H04M 3/56* (2006.01)
*H04L 5/16* (2006.01)

(52) U.S. Cl.
CPC .............. *H04M 3/562* (2013.01); *H04L 5/16* (2013.01); *H04M 3/561* (2013.01); *H04M 3/566* (2013.01); *H04M 3/567* (2013.01)

(58) Field of Classification Search
CPC .................................................... H04M 3/562
USPC ............................................ 379/202.01, 158
See application file for complete search history.

(56) References Cited

U.S. PATENT DOCUMENTS

| | | | | |
|---|---|---|---|---|
| 6,141,597 A * | 10/2000 | Botzko | ................... | H04B 1/207 379/202.01 |
| 7,886,001 B2 * | 2/2011 | Asthana | ................ | G06Q 10/06 709/204 |
| 9,237,238 B2 * | 1/2016 | Chu | ....................... | H04M 3/568 |
| 9,774,746 B1 * | 9/2017 | Sennett | ............... | H04M 7/1245 |
| 10,424,297 B1 * | 9/2019 | Carino | .................... | G10L 25/78 |
| 2002/0123895 A1 * | 9/2002 | Potekhin | .............. | H04M 3/567 704/275 |
| 2006/0056440 A1 | 3/2006 | Khartabil | | |
| 2008/0120101 A1 * | 5/2008 | Johnson | ............... | H04M 3/566 704/235 |
| 2011/0194465 A1 * | 8/2011 | Smith | .................. | H04Q 3/0016 370/260 |
| 2013/0007635 A1 * | 1/2013 | Michaelis | ............... | H04M 3/56 715/753 |
| 2013/0051543 A1 * | 2/2013 | Mcdysan | .............. | H04M 3/568 379/202.01 |
| 2013/0239180 A1 * | 9/2013 | Weller | ................. | G06Q 10/101 726/4 |
| 2015/0317123 A1 * | 11/2015 | Wu | ....................... | H04M 3/567 715/727 |
| 2016/0014277 A1 * | 1/2016 | Tichauer | ............. | H04L 65/4053 370/260 |
| 2016/0029084 A1 * | 1/2016 | Jarman | .................. | H04H 60/13 725/131 |
| 2016/0165056 A1 * | 6/2016 | Bargetzi | ............. | G06F 3/04842 455/416 |
| 2017/0076713 A1 * | 3/2017 | Gildein, II | ............... | H04N 7/15 |

(Continued)

*Primary Examiner* — William J Deane, Jr.
(74) *Attorney, Agent, or Firm* — Sheridan Ross P.C.

(57) ABSTRACT

Electronic conferences often comprise a mixture of on-site and remote participants. A moderator may selectively engage remote participants for full-duplex interactions, such in response to the remote participant "raising their hand" to signal a question or desire to speak. Systems and methods are provided to enable a moderator to utilize natural speech to be utilized as voice commands, and with no other input, to cause a remote participant to be unmuted, enabling full-duplex for the associated remote terminal, and when the question is done, re-muted and thereby returned to half-duplex.

20 Claims, 6 Drawing Sheets

On-site participants

Remote participants (56) References Cited

U.S. PATENT DOCUMENTS

2018/0262542 A1* 9/2018 Lau ................... H04M 3/564
2018/0302715 A1* 10/2018 Guo ................... H04W 4/02
2019/0174557 A1* 6/2019 Ueda .................. H04W 4/80

* cited by examiner

AUTOMATED QUEUING SYSTEM AND QUEUE MANAGEMENT

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for conferencing systems and particularly to selective engagement of remote participants for full-duplex interactions.

BACKGROUND

Meetings and presentations can take many forms. For example, in town hall-type meetings or lectures, a moderator may be interacting with one or more individuals. Often such meetings include remote participants, such as individuals utilizing a conferencing bridge.

SUMMARY

Meetings that include a mix of on-site and remote participants are often difficult to fairly or effectively manage when it comes to acknowledging questions. On-site participants may raise their hand and be noticed by the moderator, however, remote participants may have utilized a button or other input component of their conferencing application to virtually "raise their hand." However, this first requires the moderator to remember to look at the conference application screen, determine if a "hand" is raised, select the option to engage the remote participant into the conversation (e.g., unmute), interact with the remote participant, and terminate the conversation (e.g., mute).

If the moderator has walked away from the screen, they may decide to take on-site questions first while they go to the screen, which often proves distracting and further prejudices remote participants in favor of interacting with on-site participants.

Additionally, if two or more remote participants raise their hands, the moderator may not know who raised their hand first. If the moderator is the person giving the lecture, it may become difficult or distracting to keep track of questions and what order the questions came in.

These and other needs are addressed by the various embodiments and configurations of the present invention. The present invention can provide a number of advantages depending on the particular configuration. These and other advantages will be apparent from the disclosure of the invention(s) contained herein.

In one embodiment, which may serve as an overview, systems and methods are provided that enable conferencing features, such as hands-free and automatic queue management for callers' questions. While embodiments are generally directed to calls and callers (e.g., voice-only conference participants), embodiments also include audio-video and text-based communications.

The concept discloses queuing and automation of the queuing process using Artificial Intelligence (AI). In one embodiment:

1. The moderator (who may be the person giving the lecture) can start the conferencing bridge and can put the bridge in lecture mode.
2. Hundreds or thousands of participants join the bridge.
3. While the presenter/moderator is delivering the lecture, participants may ask questions. If a participant has a question, the participant will still "raise their hand" using a touch pad, voice command, or the conferencing screen.

The audience participant can use voice commands to indicate that he has a question during the conference.

4. When there is a question from the audience
   a. Since there could be multiple people with question the person who first raised his hand would enter a participant question queue
   b. The moderator will get a notification that someone has a question on the conferencing screen (already there today)—additional indicators would be (these are not there today):
      i. on the screen that he is presenting he will see an indication that there is a question
      ii. on the phone the red light indicator will fast blink indicating that there is a question on the bridge
      iii. on his headset he will hear either hear a message or a beep that would indicate the same.
5. Once the moderator is ready to answer questions, he can use a sequence of special voice instructions/commands to an artificial intelligence (AI) module to unmute the participants who are in queue, listen to their questions one at a time, and move on through the queue. When the next participant in the queue is unmuted, the previous participant who is out of the queue now will be muted automatically (e.g., command, "Let's move on to the next question"). In one embodiment, all participants who are muted would be notified by the AI system they are on mute to avoid having participants speak while muted.
6. A special tone may be given by the AI, indicating that a certain number of questions have come into the queue. With the audible alert, the moderator can open the floor for discussion. Unmuted participants will be notified by the AI that they are now off of mute and able to ask questions and/or join the discussion (e.g., command, "Let's open the floor for discussion").
7. The conferencing bridge can also be configured to detect any kind of inappropriate word usage by a participant. When detected, the AI can mute the participant automatically.

In one embodiment, a system is disclosed, comprising: a microprocessor; a data storage; and a network interface; and the microprocessor performs: receiving a voice stream, the voice stream comprising speech received from the moderator; broadcasting, via the network interface, the voice stream to remote endpoints operable to communicate in full-duplex with the system; monitoring the voice stream for an embedded conference command; upon determining that an embedded conference command is present, processing the embedded conference command; and upon determining that an embedded conference command is not present, continue the monitoring of the voice stream.

In another embodiment, a method is disclosed, comprising: receiving, by a microprocessor, a voice stream, the voice stream comprising speech received from a moderator of an electronic conference; broadcasting, by the microprocessor over a network, the voice stream to remote endpoints operable to communicate in full-duplex; monitoring the voice stream for an embedded conference command; upon determining that an embedded conference command is present, processing the embedded conference command; and upon determining that an embedded conference command is not present, continue the monitoring of the voice stream.

In another embodiment a system is disclosed, comprising: means to receive a voice stream, the voice stream comprising speech received from a moderator of an electronic conference; means to broadcast the voice stream to remote endpoints operable to communicate in full-duplex and wherein the remote endpoints are participating in the electronic conference via a communications network; monitoring the voice stream for an embedded conference command; upon determining that an embedded conference command is present, processing the embedded conference command comprising at least one of muting or unmuting at least one selected remote endpoint of the remote endpoints to alter whether audio is received from the at least one selected remote endpoint from the remote endpoints; and upon determining that an embedded conference command is not present, continue the monitoring of the voice stream.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
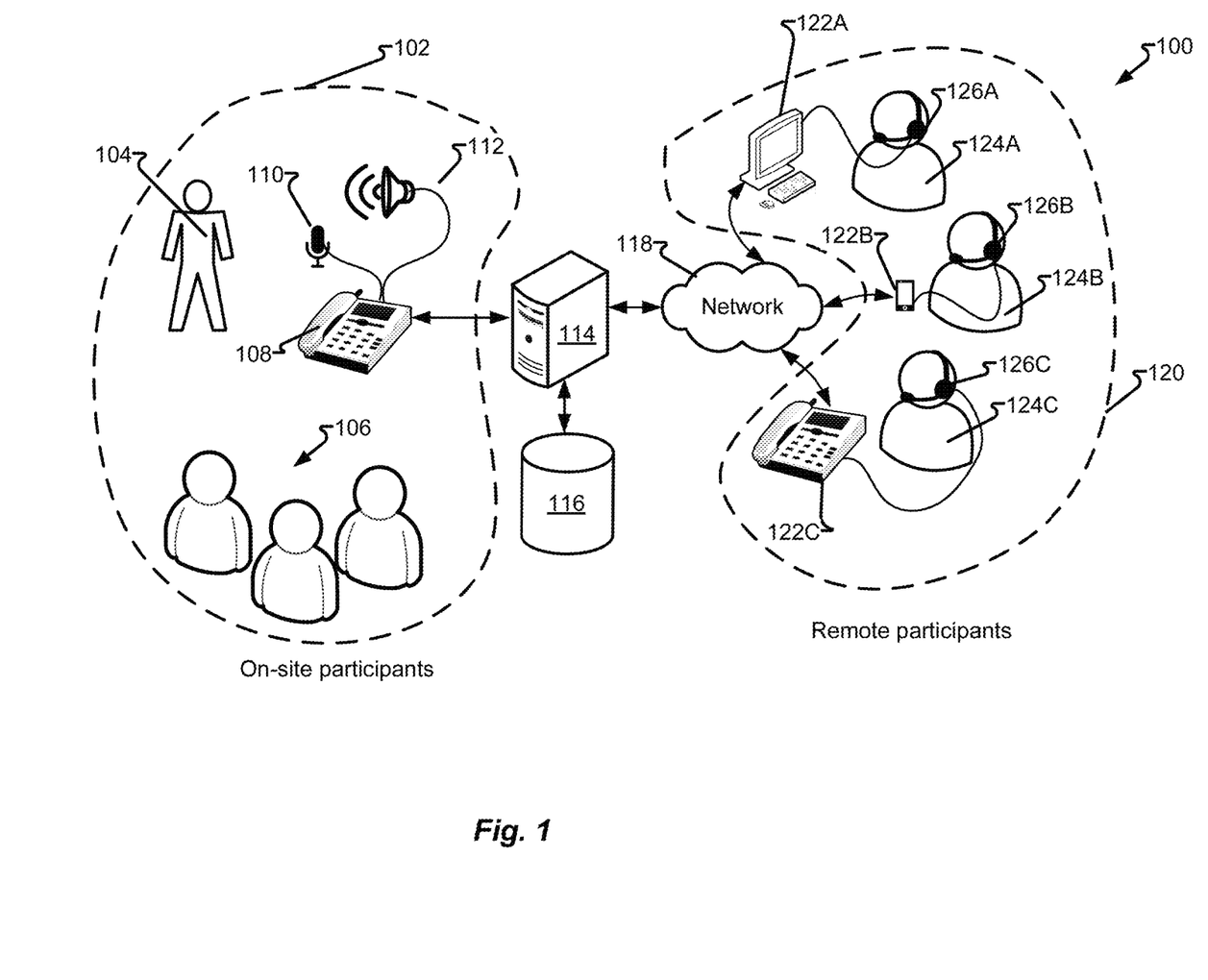
FIG. 1 depicts a first system in accordance with embodiments of the present disclosure.

FIG. 1 depicts system 100 in accordance with embodiments of the present disclosure. In one embodiment, system 100 illustrates a conference comprising remote subsystem 120 having remote participants 124 and zero or more on-site participants 106. On-site participants 106 may engage with user 104 without the need for electronic or other computing or networking equipment, however, the use of sound amplification equipment and/or video display equipment, as is often utilized for on-site presentations involving large groups to aid on-site participants 106 hearing and/or seeing user 104, may be utilized as a discrete system or overlapping components with those provided herein without departing from the scope of the embodiments.

User 104 may utilize local endpoint 108 having microphone 110 and speaker 112. As one of ordinary skill in the art will recognize, the configuration of microphone 110, speaker 112, and local endpoint 108 may be varied, such as to comprise separate components each with their own network interface and communicating with server 114 or integrated into fewer components or integrated into other components, such as server 114. In one embodiment, local endpoint 108 communicates with server 114. Server 114 may comprise or utilize data storage 116 for storing or accessing data therein. In another embodiment, local endpoint 108, server 114, and data storage 116 may be integrated into the same device.

Remote subsystem 120 comprises a number of remote participants 124 utilizing remote endpoints 122 having a network interface to connect to network 118 and, via network 118, server 114, or if omitted, directly to local endpoint 108. Network 118 is variously embodied and may comprise a data and/or communications network such that electronic signals may be conveyed thereon. Examples of network 118 include, but are not limited to, the internet, local network (e.g., LAN, WAN, etc.), cellular data and/or voice network, wired (e.g., ethernet), wireless (e.g., Bluetooth, WiFi, infrared, etc.), telephony (e.g., plain old telephone (POTS), voice over internet protocol (VoIP), session initiation protocol, (SIP)), other electronic/electro-optical network or combinations thereof.

Server 114 may be configured with instructions to process call handling and connectivity. For example, having a number of ports to connect to remote endpoints 122 via network 118, placing calls on hold, muting/unmuting, connecting/disconnecting, dialing, answering, etc. Additionally or alternatively, server 114 may be configured with instructions to perform conference management services, such as displaying identifies of remote participants 124, sharing data (e.g., files, screens, etc.), etc. Local endpoint 108 and remote endpoints 122 comprise at least the ability to send and receive audio by themselves (e.g., built in microphone/speaker) or via a peripheral or other component, such as microphone 110 and/or speaker 112. Audio input-output device 126 is similarly embodied and may be discrete from their respective remote endpoints 122 or integrated therewith and comprise an audio input component (e.g., microphone) and audio output component (e.g., speaker). To avoid unnecessarily complicating the figures, audio input-output device 126 comprise an audio input component (e.g., a device for receiving sound energy and converting it to electrical and/or data signals) and an audio output (e.g., a device for receiving electrical and/or data signals and converting such signals to sound energy) illustrated as one device.

Remote endpoints 122 may comprise devices with various input interfaces. For example, remote endpoint 122A comprises a computer which may have a keyboard, mouse, pointer, trackball, one or more display screens, etc. Such devices may be operable to receive a number of inputs and input types. In another example, remote endpoint 122B comprises a cellular telephone. Remote endpoint 122B may have a limited screen, which depending on how it is utilized by remote participant 124B, may be concealed or limited in functionality or have different functionality, as compared to remote endpoint 122A. In another example, remote endpoint 122C may comprise a telephone absent other forms of communication (e.g., voice only). Remote endpoint 122C may be inoperable for text, video, and/or data message communications, such as when remote participant 124C is participating in an electronic conference in voice (e.g., sound) mode only.

Figure 2:
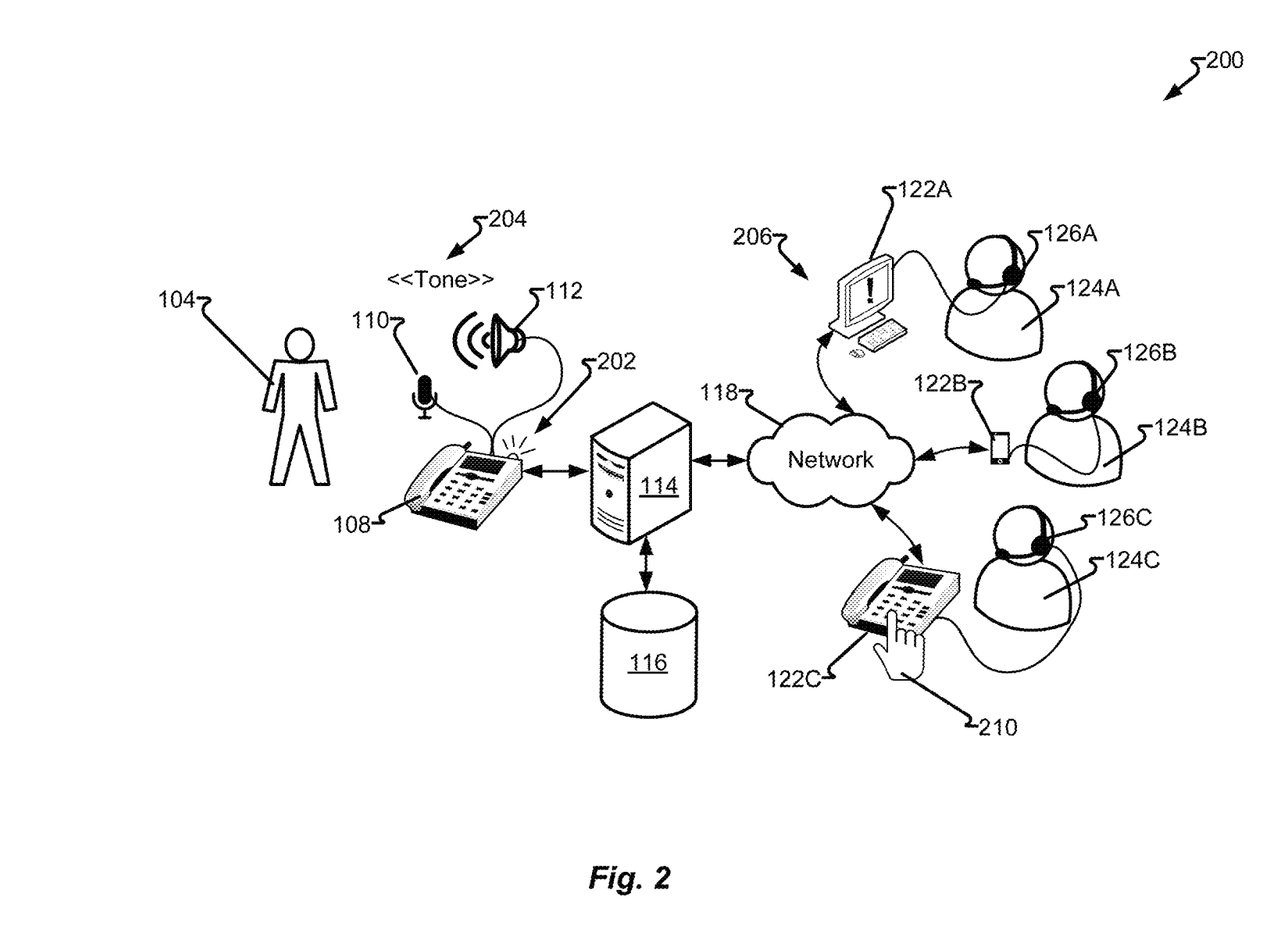
FIG. 2 depicts a second system in accordance with embodiments of the present disclosure.

FIG. 2 depicts system 200 in accordance with embodiments of the present disclosure. In one embodiment, questions are asked by a number of remote participants 124. A question may be asked of the moderator (e.g., user 104) and/or participant via the moderator. Electronic conferences may mute some or all non-speaking participants. For example, an electronic conference may be presented by user 104 and each remote endpoints 122 operates in half-duplex. As used herein, half-duplex occurs when one or more endpoints (e.g., remote endpoints 122 and/or local endpoint 108) is able to receive sound from server 114 but any sound provided to server 114 is not conveyed to other parties by server 114. For example, remote endpoint 122 and/or local endpoint 108 may be muted at the device, at server 114, or other component. As a result, non-active participants may hear, such as hearing the active participant, but not speak or otherwise pride audio to the electronic conference.

Should one or more remote participants 124 wish to engage in full-duplex communication, such that their voice or audio input is conveyed to others via server 114, an input is first received on their respective remote endpoints 122. For example, remote endpoint 122A may click on an icon or other graphical interface. In another example, remote endpoint 122C may press 210 a key on remote endpoint 122C. As a result of the input, a signal is provided to server 114 that one or more remote participants 124 have "raised their hand" (e.g., signaled a desire to speak, such as to ask user 104 or other participant a question). In another embodiment, a remote participant 124 may be in half-duplex mode, as muted by server 114 and monitored by server 114, such as to enable a remote participant 124 to say, "I have a question" and thereby "raise their hand" without be heard by others.

In response to having at least one participant "raise their hand," server 114 causes alerting component 202 to be energized. Alerting component 202 may comprise a light or alerting audio signal 204, which may be presented by speaker 112. When local endpoint 108 is embodied as a computer, alerting component 202 may be a portion of a display element, such as an icon, color, text message, etc. to notify user 104 that at least one participant has "raised their hand." Additionally, participants may be notified that they have successfully signaled server 114 that they have "raised their hand" by a notification, such as a tone or icon 206.

In another embodiment, server 114 may manage a queue such that a first-in-first-out queue. Therefore, when user 104 requests the "next" question, a microprocessor of server 114 accesses a data structure comprising indicia of the particular remote endpoint(s) 122 associated with a "raise hand" signal and accesses the oldest entry. In another embodiment, a particular topic maybe identified such that user 104 may ask if there are desired questions or discussions related to a particular topic. For example, "Let's take any questions about next quarter's sales forecasts." Accordingly, questions related to other topics, regardless of age, may be ignored or deprioritized in favor of questions with the same topic.

In another embodiment, user 104 may engage with conference management logic of server 114 utilizing natural language. For example, user 104 may ask, "Do we have any questions on the line?" or "Let's take the next question." Server 114 receive the same audio stream that is provided by user 104 utilizing microphone 110 for both conference content and commands. At least one microprocessor of server 114 monitors the audio stream and determines if an embedded command is present and, if so, responds accordingly.

The embedded command may be a preset command (e.g., "Next question.") or it may comprise logic to find commands in natural language, such operations and operands may be maintained in a memory of server 114, data storage 116, other location, and/or a combination thereof. Additionally or alternatively, server 114 may self-learn. For example, if an embedded command is presented, but not understood by server 114 as an embodied command, user 104 may signal server 114 that the command was missed. For example: "Is everyone clear on that?" may not be recognized as a command via a microprocessor of server 114 determining that the statement matched any identified commands literally or via an entry in an equivalency data structure. User 104 may then provide an indication that a command was present, "I can see that someone has a question." Accordingly, server 114 may then create an entry into a data structure that indicates when the question, "Is everyone clear on that?" is asked, it is equivalent to the command, "Next question."

While user 104 may have access to a display providing status of questions, the moderator or presenter roll may be transferred to another participant, such as remote participant 124C, who may be not able to view a screen or utilizing a device, such as remote endpoint 122C, that is absent display functionality. As a result, being able to speak naturally to both convey the contents of the presentation, as well as to issue conference commands is particularly beneficial. For example, floor control of an electronic conference may be transferred to remote participant 124C who may speak for a period of time and then ask, "Does anyone have any questions?" If no questions are present (e.g., server 114 does not have any indicia set by receiving a signal indicating a "raised hand" enqueued) the system may provide a tone or generated speech to indicate that there are no questions. However, if server 114 does have indicia of a "raised hand," the oldest (or topic-relevant) endpoint, such as from one or more of remote endpoint 122A-B or local endpoint 108, server 114 may recognize the embedded command and unmute the respective input to cause such an endpoint to be in full-duplex mode and be able to both hear and be heard by other participants. For example, in response to a moderator (e.g., user 104 or remote participant 124C) asking, "Does anyone have any questions?" remote endpoint 122A may be unmuted, and become full-duplex, and provide remote participant 124C to be heard by the moderator and other participants.

Server 114 may receive from an audio stream, providing conference content, and determine the audio stream comprises a conference command without any other signal or cue. For example, server 114 omits consideration or use of an announcement cue (e.g., "Hey Siri," "Alexa," "Conference System,") or signal (e.g., selecting a screen element or button indicating a command) to determine an embedded command or announcing the command is to follow. Additionally or alternatively, other commands may be detected and implemented, such as, "Let's record this," to cause server 114 to determine a command is present and execute the command (e.g., start recording service).

Figure 3:
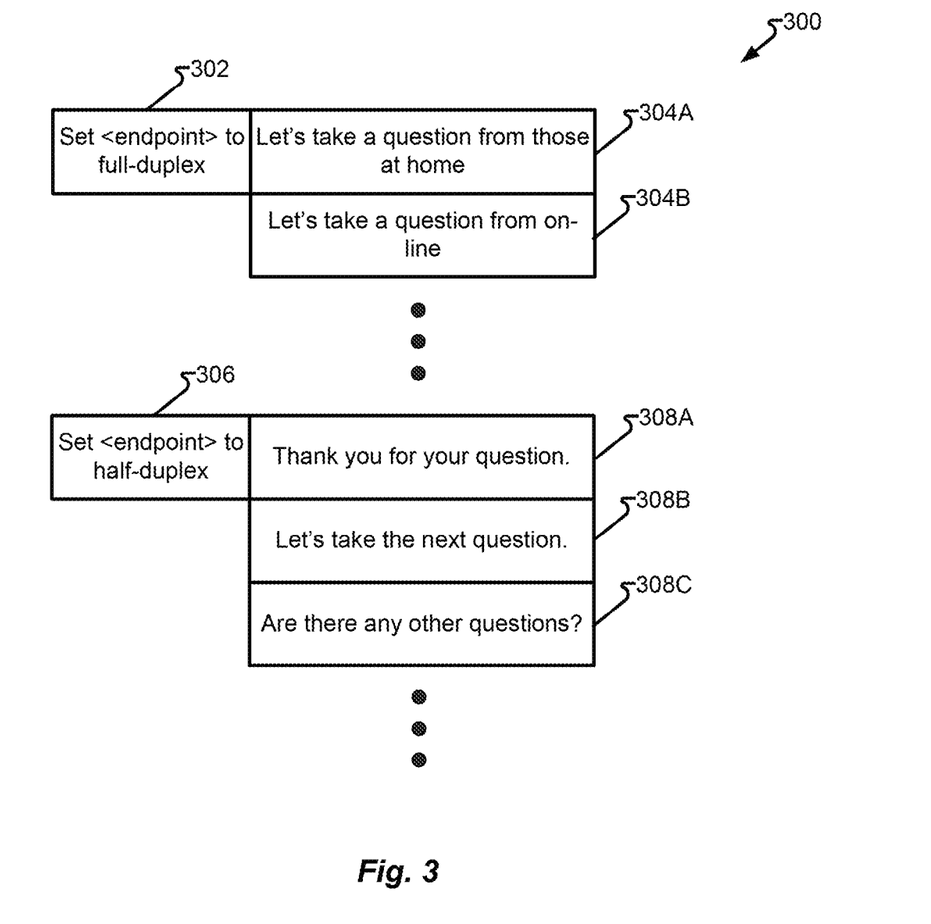
FIG. 3 depicts a data structure in accordance with embodiments of the present disclosure.

FIG. 3 depicts data structure 300 in accordance with embodiments of the present disclosure. Data structure 300 may comprise rules and/or setting/configurations used by the server 114 to make decisions or execute actions. Data structure 300 may also be updated by the server 114 with new and/or modified rules and/or settings/configurations as it undergoes self-learning. For example, if an action is performed and then undone by a moderator, the data structure may be modified to disable such a rule. In one embodiment, data structure 300 may comprise a command, such as to set a particular endpoint or endpoints to full duplex (e.g., a command maintained in field 302) and spoken phrases 304 associated with command in field 302. Another command 306 may cause a particular endpoint to half-duplex (e.g., audio muted) upon the occurrence of any one of spoken phrases 308 being detected in an audio stream. In another embodiment, server 114 may utilize a table of equivalence for words or phrases such that synonyms may be processed without requiring every combination of syntactically equivalent words or phrases to be entered in data structure 300.

Figure 4:
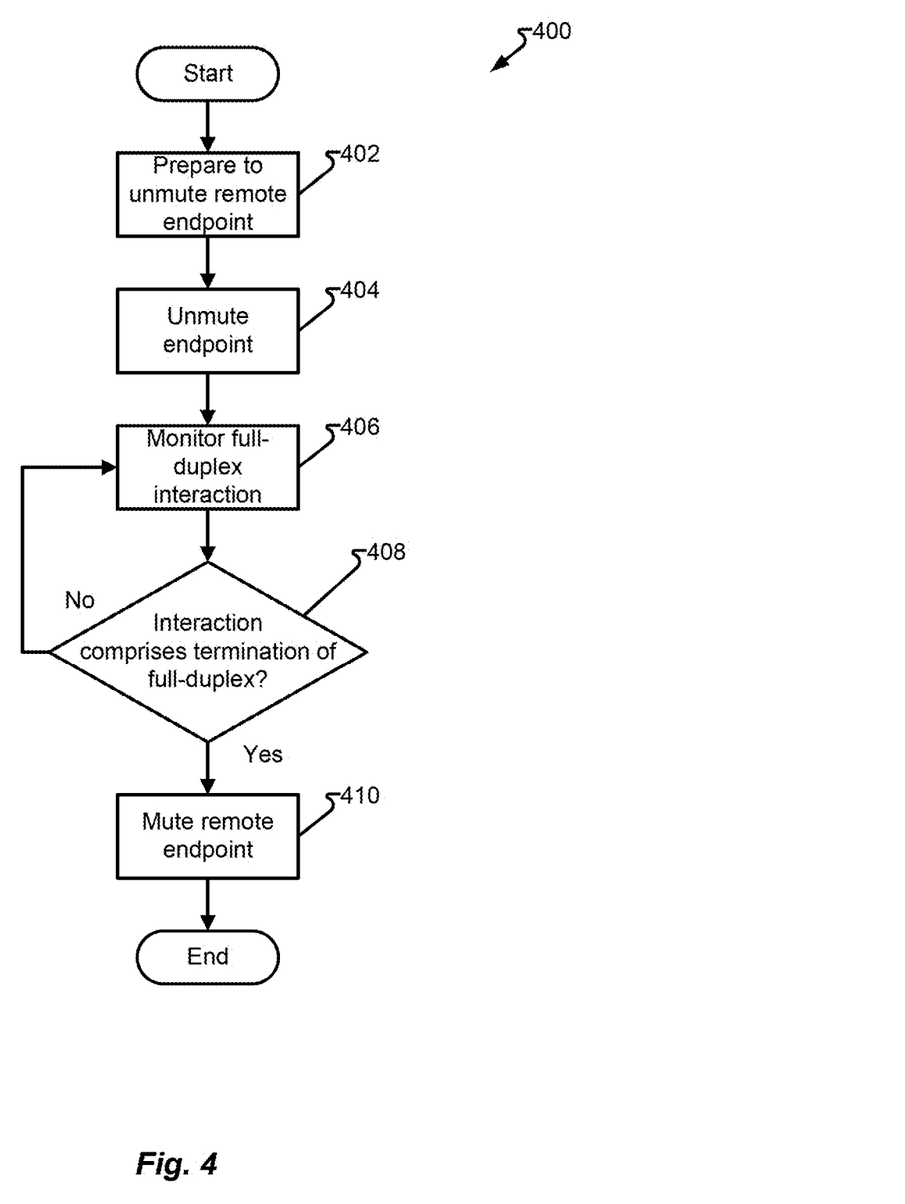
FIG. 4 depicts a first process in accordance with embodiments of the present disclosure.

FIG. 4 depicts process 400 in accordance with embodiments of the present disclosure. In one embodiment, process 400 is executed by at least one microprocessor of server 114 as an algorithm encoded as machine-code to configure the at least one microprocessor. Process 400 may be executed upon a microprocessor determining that a voice stream comprises an embedded command. In step 402 a preparation is made to unmute an endpoint, such as one of remote endpoints 122 to enable full-duplex communications with on-site subsystem 102 via local endpoint 108 and/or the other remote participants 124 via their respective remote endpoints 122. Step 402 may announce to the particular endpoint via a "whisper mode" (e.g., audio, pop-up message, tone, graphical element, or other indicator provided only to the particular endpoint that is about to be unmuted). For example, on-site subsystem 102 may speak: "Let's take the next question" or if already engaged in another full-duplex communication with a different endpoint, say: "Thank you for your question" or "Does that answer your question?" as a signal that a different endpoint is about to be unmuted. Accordingly, an announcement is provided to the endpoint about to be unmuted to notify the associated remote participant 124 that they are about to be in full-duplex mode.

In step 404, the endpoint is unmuted and thereby goes from half-duplex to full-duplex and can be heard as conference content by the other participants. Step 406 then monitors the full-duplex interaction (e.g., a voice stream comprising the participant/moderator associated with the endpoint(s) in full-duplex mode) and test 408 determines if the interaction comprises a termination. For example, the participant could say, "Thank you," "I'll have to think about that," "I'll have to get back to you," or other phrase or equivalent, such as may be maintained in data structure 300 that serves as a termination cue. Similarly, another party, such as user 104 may say, "Let's take the next question," "Does anyone else have a question?" "That's all the time we have." or other phrase or equivalent, such as may be maintained in data structure 300 that serves as a termination cue. If test 406 is determined in the negative, process 300 may then loop back to step 406 and continue monitoring. If test 406 is determined in the affirmative, then processing continues to step 410. In step 410 the endpoint, unmuted in step 404, is re-muted and returned to half-duplex and is then enabled to listen to the electronic conference but not contribute audio to the electronic conference.

Figure 5:
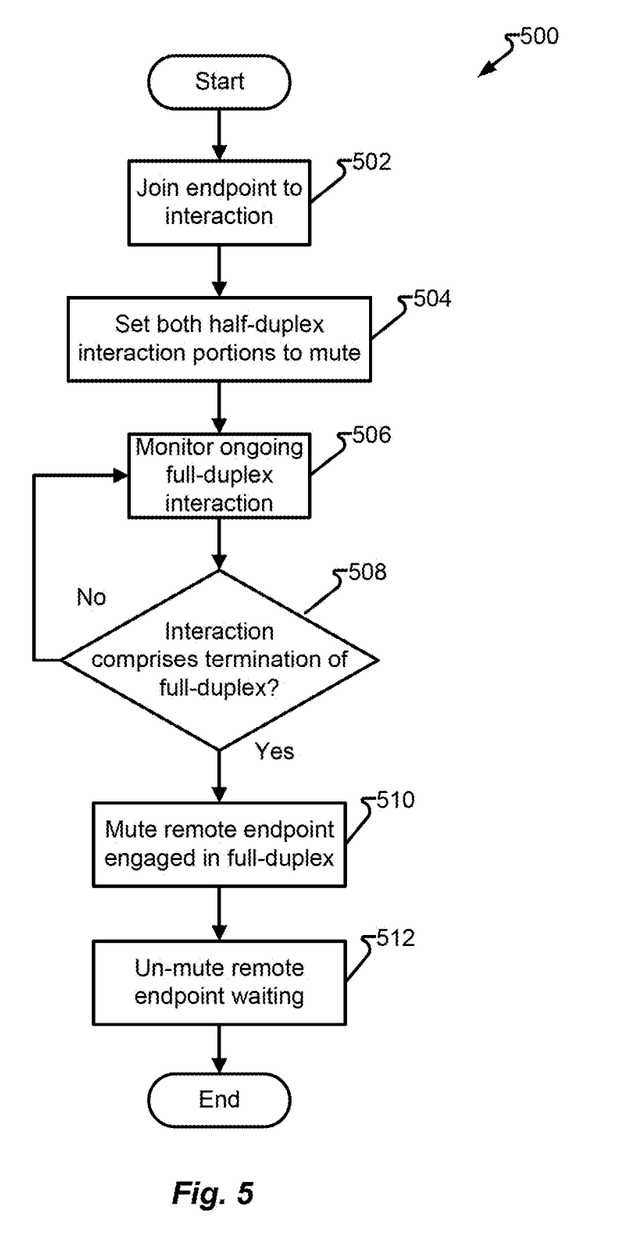
FIG. 5 depicts a second process in accordance with embodiments of the present disclosure.

FIG. 5 depicts process 500 in accordance with embodiments of the present disclosure. In one embodiment, process 500 is executed by at least one microprocessor of server 114 as an algorithm encoded as machine-code to configure the at least one microprocessor. Process 400 may be executed upon a microprocessor determining that a voice stream comprises an embedded command. In one embodiment, process 500 may be utilized to establish a "waiting room" for one or more remote endpoints 122. For example, an electronic conference may be established utilizing server 114 and local endpoint 108, such as to interview a number of job candidates. Candidates may have a time to call-in, or otherwise connect to the electronic conference, but on-site subsystem 102 may be an interviewer who does not want any conversations to be heard by interviewees waiting for their interview. Accordingly, step 502 joins an endpoint (e.g., one of remote endpoints 122) to the interaction and in step 504 is muted on both halves of the connection. Additionally or alternatively, step 504 may provide different audio and/or video (e.g., "Please wait, we will be with you shortly," music on hold, placeholder video, etc.).

Step 506 monitors the ongoing full-duplex interaction comprising endpoints (e.g., local endpoint 108 and one or more, but less than all, remote endpoints 122). If step 508 determines the interaction is complete, such as by step 506 discovering a match in data structure 300 having an associated spoken phrase 304, 308, etc. associated with a command indicated termination, step 510 may then mute (with respect to both sending and receiving) or drop or put the participant back in the queue as needed and unmute the waiting endpoint for full-duplex communications in step 512. If test 508 is determined in the negative, processing may loop back to step 506.

Figure 6:
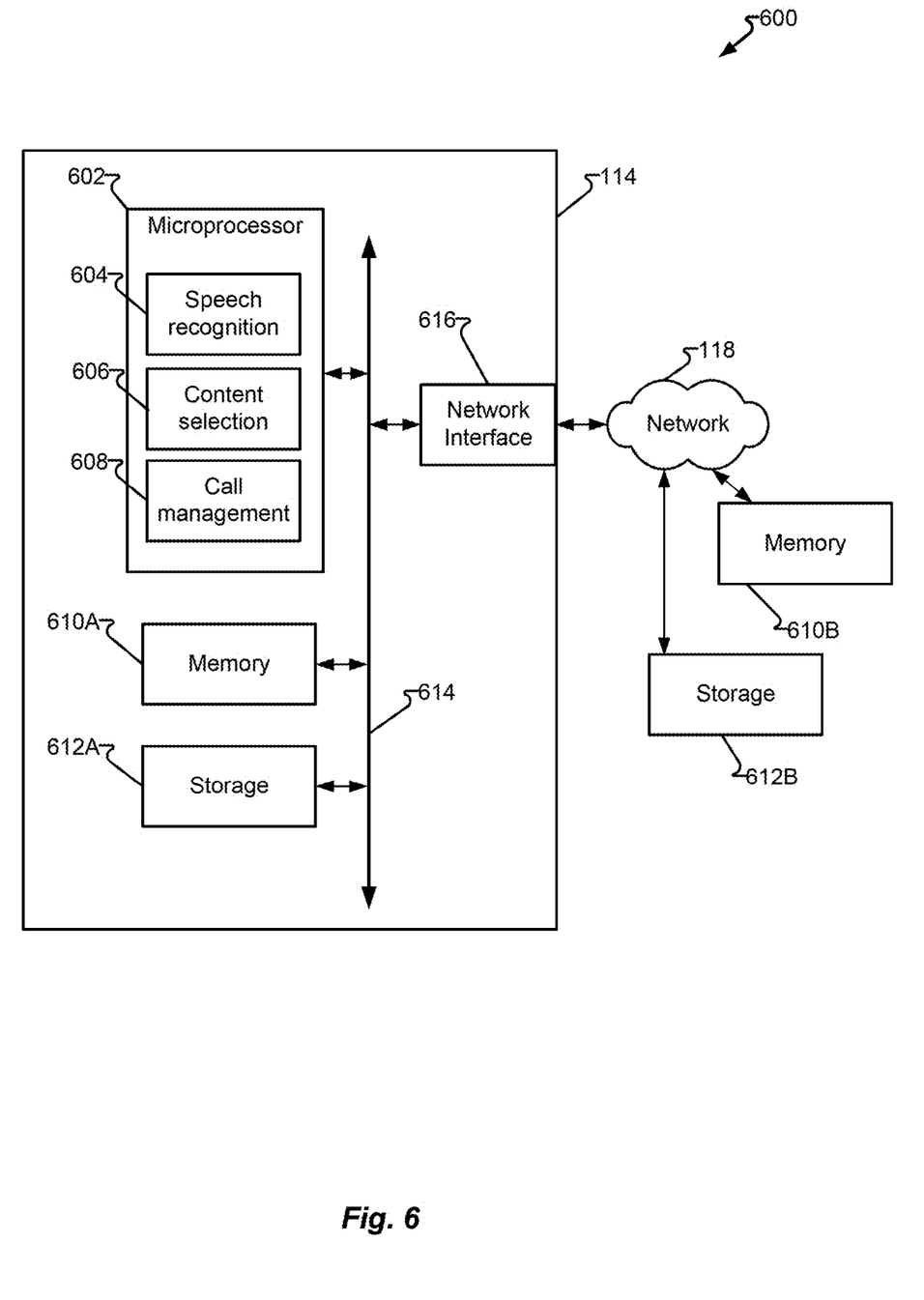
FIG. 6 depicts a server system in accordance with embodiments of the present disclosure.

FIG. 6 depicts server system 600 in accordance with embodiments of the present disclosure. It should be appreciated that server 114 may comprise the addition of or omission of certain components, which may be deployed on a different server or other computing device or devices. Server 114 may comprise microprocessor 602 configured, via wiring, circuitry, instructions or a combination thereof, to perform the operations described herein and optionally other operations. Server 114 may comprise speech recognition 604 which may be utilized to receive waveforms, such as from local endpoint 108 and/or remote endpoints 122, and convert the waveform into machine inputs and thereby enable microprocessor 602 to be responsive to voice inputs. Content selection 620 determines an appropriate response. For example, receiving a waveform of "Thank you for the question?" may be converted to text or other machine-understandable representation and compared to entries in data structure 300 and/or equivalents to determine whether an embedded command is present and, if so, executing the command by microprocessor 502. accessing a particular data record (e.g., balance information) for a particular user's (e.g., user 102) account and providing the value to speech generator 1204 for generation and transmission. Optionally, microprocessor 602 may utilized call management 608, such as to connect, disconnect, transfer, place on/off hold, etc. communications over network 118. However, it should be appreciated that other components may be utilized to provide call management services.

Microprocessor 602 may have on-chip memory, such as data registers holding values that cause the microprocessor to perform a particular action (e.g., machine code). Additionally or alternatively, memory 610 may store data and/or instructions for microprocessor 602, such as in ROM, RAM, media, solid state storage, etc. Storage 612 may comprise media storage that is magnetic, optical, or electrical, such as to maintain data or instructions not currently needed and may further include one or more of settings and speech content database 116, data structure 300, textual or phrasing equivalents (e.g., "Let's continue this later" may be equivalent to "Thank you for your question" and mean, mute the endpoint currently in full-duplex and/or unmute the next endpoint). Memory 610 may comprise internal memory 610A and/or external memory 610B. Similarly, storage 612 may comprise internal storage 612A and/or external storage 612B. Microprocessor 602 and other components maybe interconnected via internal bus 614 and/or network interface 616 connecting to other systems and networks, including remote endpoints 122. Network interface 616 may comprise an interface to an internal network (e.g., Ethernet, WiFi, etc.) and/or external network (e.g., Internet, PSTN, etc.), which may comprise network 118. Internal bus 614 may be any data-conveyance system, including but not limited to one or more of a bus, backplane, cable, PCI, PCIe, etc. providing control, address, and/or data conveyance.

Microprocessor 602 provides circuitry to perform computational operations, such as registers, I/O unit, buffers, queue pointers, etc. which may be configured upon loading of software or, in another embodiment, circuit-programmed (e.g., ASIC).

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a microprocessor;
a data storage; and
a network interface; and
the microprocessor performs:
receiving a voice stream, the voice stream comprising speech received from a moderator;
broadcasting, via the network interface, the voice stream to remote endpoints operable to communicate in full-duplex with the system;
monitoring the voice stream for a spoken phrase;
accessing the data storage comprising an equivalency data structure, the equivalency data structure comprising a conferencing command field, the conferencing command field comprising an embedded conference command, and a spoken phrase field comprising a plurality of phrases associated with the conferencing command field;
upon determining that the spoken phrase matches one of the plurality of phrases,
processing the embedded conference command; and
upon determining that an embedded conference command is not present, continue the monitoring of the voice stream.

2. The system of claim 1, wherein the microprocessor performs the determining that the embedded conference command is present in the voice stream further comprises the microprocessor determining the embedded conference command is present within the voice stream and the microprocessor receives no other cue indicating nor introducing the embedded conference command.

3. The system of claim 1, wherein:
the embedded conference command comprises a first command for a full interaction with a first one of the remote endpoints; and
the microprocessor, unmutes an audio from the first one of the remote endpoints.

4. The system of claim 3, wherein:
the embedded conference command comprises a second command for a full interaction with a second one of the remote endpoints; and
the microprocessor, excludes audio from the first one of the remote endpoints and unmutes audio from the second one of the remote endpoints.

5. The system of claim 3, wherein the microprocessor further performs the unmuting by inserting an audio unmuting announcement into the voice stream of the first one of the remote endpoints prior to performing the unmuting.

6. The system of claim 3, wherein the microprocessor further performs re-muting the first one of the remote endpoints upon determining that spoken content provided in the unmuted audio from the first one of the remote endpoints comprises banned content.

7. The system of claim 1, wherein the microprocessor broadcasts the voice stream to the remote endpoints and mutes audio from the remote endpoints.

8. The system of claim 1, further comprising:
an alerting component; and
wherein the microprocessor further performs:
receiving, from a first one of the remote endpoints, a signal indicating a request for a user associated with the first one of the remote endpoints wishes to engage in full-duplex communications; and
in response to receiving the signal, causing the alerting component to be energized.

9. The system of claim 8, wherein the microprocessor enqueues indicia of the signal in a question queue in a position associated with an order received.

10. The system of claim 9, wherein the microprocessor, upon receiving the embedded conference command associated with engaging a next remote participant in full-duplex mode, selects one of the remote endpoints having a next position in the question queue.

11. The system of claim 9, wherein the microprocessor, upon receiving the embedded conference command associated with engaging a next remote participant in full-duplex mode and further identifying a topic, selects one of the remote endpoints having a next position in the question queue and associated with the topic.

12. The system of claim 1, wherein the microprocessor further performs:
placing at least one endpoint on hold and omitting the broadcasting of the voice stream to the at least one endpoint; and
upon receiving the embedded conference command associated with a next participant, unmuting the at least one endpoint on hold and initiating the broadcasting of the voice stream to the at least one endpoint.

13. A method, comprising:
receiving, by a microprocessor, a voice stream, the voice stream comprising speech received from a moderator of an electronic conference;
broadcasting, by the microprocessor over a network, the voice stream to remote endpoints operable to communicate in full-duplex;
monitoring the voice stream for a spoken phrase;
accessing an equivalency data structure, comprising a conferencing command field, the conferencing command field comprising an embedded conference command, and a spoken phrase field comprising a plurality of phrases associated with the conferencing command field;
upon determining that the spoken phrase matches one of the plurality of phrases,
processing the embedded conference command; and
upon determining that an embedded conference command is not present, continue the monitoring of the voice stream.

14. The method of claim 13, wherein the determining that the embedded conference command is present in the voice stream further comprises the microprocessor determining the embedded conference command is present within the voice stream and the microprocessor receives no other cue indicating nor introducing the embedded conference command.

15. The method of claim 13, further comprising:
determining, by the microprocessor, whether the embedded conference command comprises a first command for a full interaction with a first one of the remote endpoints; and
in response to the determination the embedded conference command does comprises the first command for the full interaction with the first one of the remote endpoints, unmuting, by the microprocessor, audio from the first one of the remote endpoints.

16. The method of claim 15, further comprising:
determining, by the microprocessor, whether the embedded conference command comprises a second command for a full interaction with a second one of the remote endpoints; and
in response to the determination that the embedded conference command comprises the second command for the full interaction with the second one of the remote endpoints, muting, by the microprocessor, the audio from the first one of the remote endpoints and unmutes audio from the second one of the remote endpoints.

17. The method of claim 15, wherein the unmuting further comprises inserting, by the microprocessor, an audio unmuting announcement into the voice stream of the first one of the remote endpoints prior to performing the unmuting.

18. The method of claim 13, further comprising:
receiving, from a first one of the remote endpoints, a signal indicating a request for a user associated with the first one of the remote endpoints wishes to engage in full-duplex communications; and
in response to receiving the signal, energizing an alerting component.

19. The system of claim 8, further comprising enqueuing indicia of the signal in a question queue in a position associated with a predetermined order.

20. A system, comprising:
means to receive a voice stream, the voice stream comprising speech received from a moderator of an electronic conference;
means to broadcast the voice stream to remote endpoints operable to communicate in full-duplex and wherein the remote endpoints are participating in the electronic conference via a communications network;
monitoring the voice stream for a spoken phrase;
means to access an equivalency data structure, the equivalency data structure comprising a conferencing command field, the conferencing command field comprising an embedded conference command, and a spoken phrase field comprising a plurality of phrases associated with the conferencing command field;
means to, upon determining that the spoken phrase matches one of the plurality of phrases,
process the embedded conference command comprising at least one of muting or unmuting at least one selected remote endpoint of the remote endpoints to alter whether audio is received from the at least one selected remote endpoint from the remote endpoints; and
upon determining that an embedded conference command is not present, means to continue the monitoring of the voice stream.

* * * * *